May 15, 1928.  1,669,814
W. A. GEIGER
FRICTION SHOCK ABSORBING MECHANISM
Original Filed July 10, 1924  2 Sheets-Sheet 2
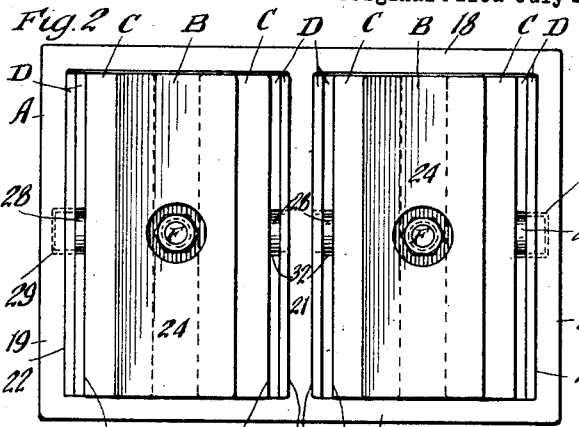
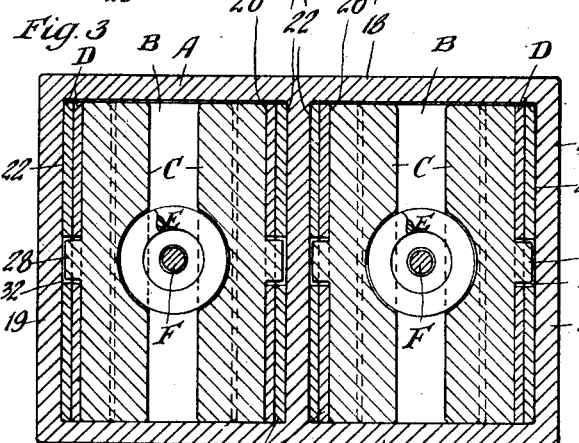
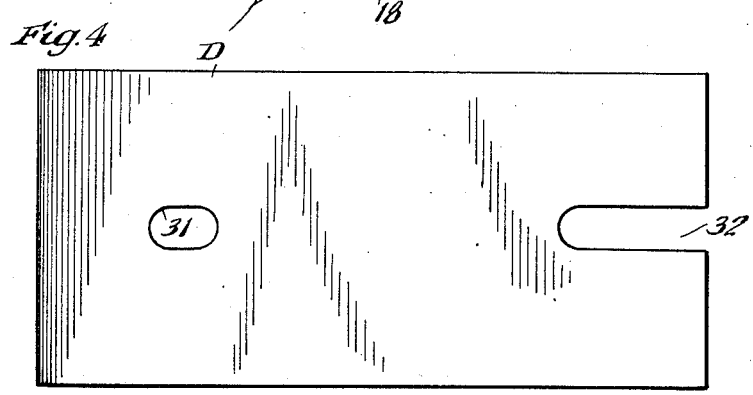
Witnesses
Hans M. Rachlitz
Inventor
William A Geiger
By George D Haight
His Atty.

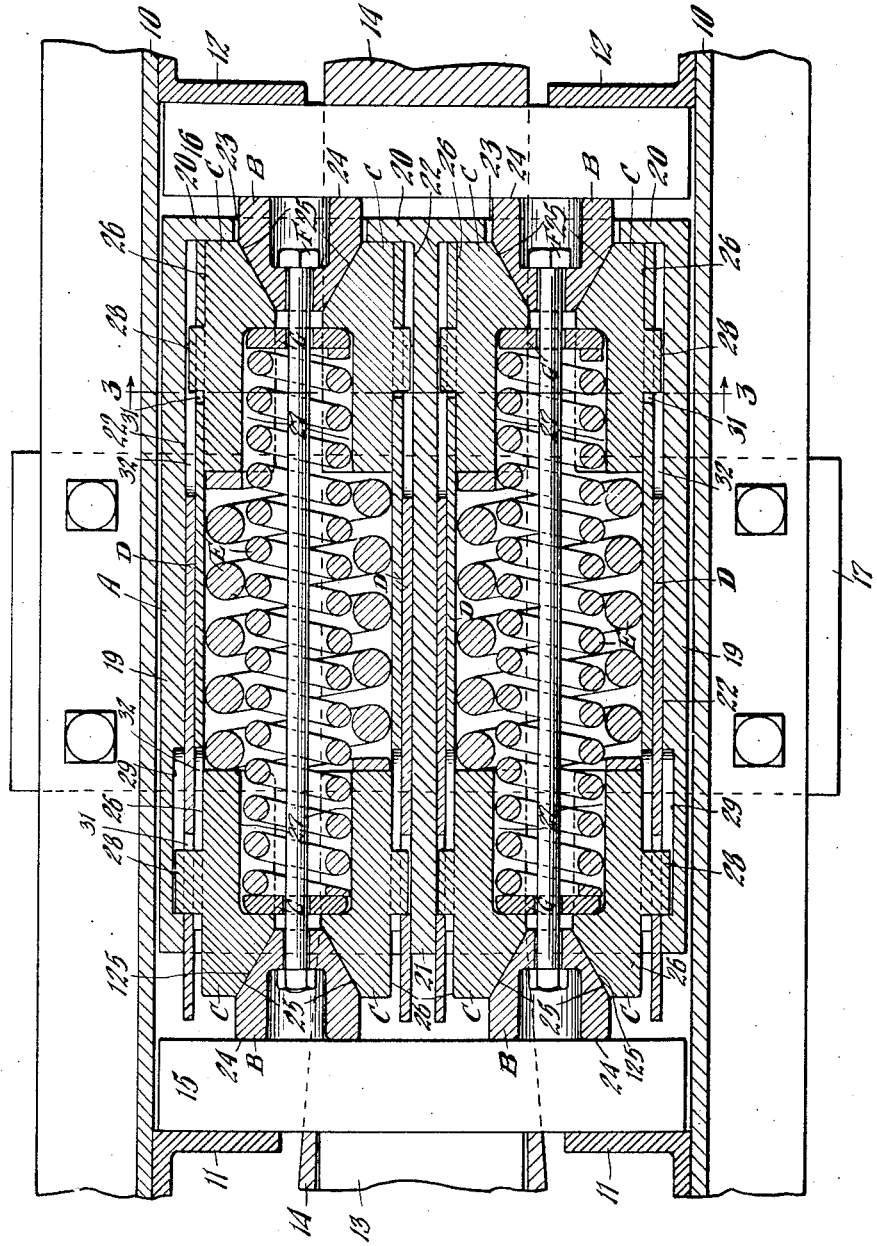

Patented May 15, 1928.

1,669,814

UNITED STATES PATENT OFFICE.

WILLIAM A. GEIGER, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 10, 1924, Serial No. 725,110. Renewed January 26, 1928.

This invention relates to friction shock absorbing mechanisms.

One object of the invention is to provide a friction shock absorbing mechanism, of the friction plate type, especially designed for railway draft riggings, wherein is obtained high capacity, together with quick release, comprising a plurality of friction shell elements with which cooperate a plurality of simultaneously operating friction systems, each complete friction system including a plurality of relatively movable plates and duplicate spreading means.

Other objects and advantages of the invention will more clearly and fully appear from the description and claims hereinafter following.

In the drawings, forming a part of this specification, Figure 1 is a longitudinal, horizontal, sectional view of a railway draft rigging showing my improvements in connection therewith. Figure 2 is a front end, elevational view of the shock absorbing mechanism proper. Figure 3 is a vertical, transverse sectional view of the shock absorbing mechanism proper, corresponding substantially to the line 3—3 of Figure 1. And Figure 4 is a detail side elevational view of a friction plate used in connection with my improved mechanism.

In said drawings, 10—10 indicate channel-shaped center or draft sills of a railway car underframe, to the inner faces of which are secured front stop lugs 11—11 and rear stop lugs 12—12. The inner end of the drawbar is designated by 13 to which is operatively connected a hooded yoke 14. Within the yoke 14 is supported the shock absorbing mechanism proper and front and rear followers 15 and 16. The movable parts of the shock absorbing mechanism are operatively supported by a detachable saddle plate 17.

The improved shock absorbing mechanism proper, as shown, comprises broadly, a casing A; two front and two rear wedge blocks B—B; two pairs of front and rear wedge friction shoes C—C; four sets of friction plates D—D; twin arranged spring resistance elements E—E; a pair of retainer bolts F—F; and front and rear pairs of spring followers G—G.

The casing A is in the form of a rectangular box-like casting open at the front end, and has spaced, longitudinally disposed, top and bottom walls 18—18 longitudinally disposed, spaced side walls 19—19, a transverse end wall 20 and a longitudinally disposed, central strengthening partition wall 21 formed integral with the end wall 20 and the top and bottom walls 18—18 and extending to the front end of the casing. The partition wall 21 divides the casing into a pair of twin friction shells. The inner surfaces of the side walls 19 and the opposite sides of the partition wall 21 present pairs of opposed friction surfaces 22 with which the plates D are adapted to co-operate. As clearly shown in Figures 1 and 2, each shell section of the casing A thus presents two longitudinally disposed, opposed friction surfaces. The end wall 20 is provided with a pair of rectangular openings 23, each opening 23 being disposed midway between the central partition wall 21 and the corresponding side wall 19 of the shell and adapted to freely receive the corresponding wedge block B for working movement therein, the wedge block B projecting through the opening to properly cooperate with the corresponding pair of friction wedge shoes C.

The wedges B, which are four in number, are arranged in pairs at opposite ends of the mechanism. One of said front and rear wedges cooperating with the friction mechanism of each friction shell. The wedges B are in the form of hollow castings, and each has a flat outer face 24 adapted to abut the inner surface of the corresponding main follower. Each block is provided with a pair of faces 25 at the opposite sides thereof, converging inwardly of the mechanism and adapted to coact with the adjacent pairs of friction wedge shoes.

The friction wedge shoes C, which are arranged in pairs cooperating with the corresponding front and rear wedges B, are of substantially similar construction. On the side nearest the longitudinal central axis of each friction shell, each shoe C has a wedge face 125 adapted to cooperate with one of the wedge faces 25 of the corresponding wedge block B. At the opposite side, the shoe is provided with a longitudinally disposed, flat friction surface 26, adapted to cooperate with the innermost plate of the corresponding set D. Inwardly beyond the wedge face, each shoe is cut away as indicated at 27 to receive the corresponding side of the inner coil of spring resistance E, a shoulder being thus provided forming an abutment for the corresponding spring follower G. On the outer side midway between the ends thereof, each shoe has a laterally projecting lug 28. The lugs 28 of the two front shoes disposed adjacent the side walls 19 project a greater distance than the lugs of the remaining shoes. As clearly shown in Figure 1, the lugs 28 of the said two front shoes are adapted to work in longitudinally disposed recesses 29 formed in the side walls 19 of the casing A, the recesses 29 being located adjacent the front end of the casing and accommodating the outer ends of the corresponding lugs 28 for sliding movement, the lugs being adapted to engage the outer end walls of the recesses to limit the outward movement of the shoes and assist in the restoration of the shell to normal position. The rear pairs of shoes abut the end wall 20 of the casing A, thereby limiting the outward movement of the shoe, and together with the lugs of the front shoes effecting restoration of the shell to normal position.

The friction plates D, which are all of like construction, are provided with an elongated opening 31, adjacent one end thereof and an inwardly extending slot 32 at the opposite end thereof, the slot and opening being in longitudinal alignment and equally spaced from the top and bottom edges of the plate. In the instance shown, eight plates are employed, the same being divided into four sets of two plates each, two sets being associated with each friction shell. As clearly shown in Figure 1, the two sets of plates of each shell are disposed on opposite sides thereof, cooperating respectively with the friction surface 22 of one of the side walls of the shell and the opposed friction surface 22 of the partition wall 21. The plates of each set are reversely arranged, the outermost plate of each set having the end provided with the opening 31 disposed at the front end, and the innermost plates having the end provided with the opening 31 at the rear end of the mechanism. The recesses 31 are adapted to receive the lugs 28 of the corresponding friction wedge shoes C for limited sliding movement. As clearly shown in Figure 1, the front ends of the outermost plates of each set are slightly spaced from the front follower 15 and the rear ends of the innermost plates bear on the transverse end wall 20 of the casing A. The openings 31 of the plates are of such a length as to permit sufficient inward movement of the shoes with reference to the plates to permit the front follower 15 to engage the outer ends of the outer plates of each set and the rear wall of the shell A to be engaged by the rear follower 16, during the compression of the mechanism. The slots 32 of the plates D are adapted to slidingly accommodate the lugs 28 of the shoes, the slots being of such a length as to permit the full, necessary relative movement of the plates during a compression stroke of the mechanism.

The spring resistance elements E, which are twin arranged, each comprise a relatively light inner coil interposed between the corresponding front and rear spring followers G, and a relatively heavier, outer coil interposed between the inner ends of the corresponding pairs of front and rear wedge friction shoes C. The retainer bolts F are arranged at opposite sides of the mechanism, and serve to hold the parts in assembled relation and maintain the mechanism of uniform over-all length, each bolt having its opposite ends anchored to the corresponding front and rear wedge blocks B and having the shank thereof extending through the corresponding inner coil of the spring resistance E and aligned openings formed in the front and rear spring followers G.

The normal position of the parts is shown in Figure 1. In this position of the parts, the rear wall 20 of the casing A is slightly spaced from the inner face of the main follower 16 and the front ends of the outer plates of each set are spaced a corresponding distance from the inner face of the front follower 15. The outer ends of the rear pairs of friction wedge shoes C and the rear ends of the innermost plates of the sets D bear on the inner surface of the end wall 20 of the casing A.

The operation of my improved shock absorbing mechanism is as follows. During a compression stroke of the mechanism the followers 15 and 16 will be moved relatively to each other carrying therewith the front and rear pairs of wedge blocks C, setting up a wedging action between each block and the corresponding pair of friction wedge shoes and placing the various sets of friction plates under lateral pressure. As the front and rear followers move toward each other, the front and rear pairs of wedge shoes C will be carried inwardly relatively toward each other, slipping on the innermost plates of each set. At the same time, due to the friction existing between the plates of each set and between the sets of plates and the casing A, the front follower and rear follower will approach the front ends of the outermost plates of each set and the rear wall 20 of the casing at substantially the same rate. This movement will continue until the outermost plates are engaged by the front follower, and the rear end of the casing is engaged by the rear follower, whereupon the plates of each set will be moved relatively to each other, the innermost plates being moved by engagement with the inner surface of the end wall 20 of the casing.

This action will continue until the front follower engages the outer end of the casing A, whereupon forces will be transmitted directly through the casing and the follower to the corresponding stop lugs, the casing walls and central partition wall 21 together forming a solid column load transmitting member. The springs are thus prevented from being driven solid.

During the initial action of the mechanism, the lugs 28 of the shoes will be moved out of engagement with the outer end walls of the corresponding openings 31 of the friction plates D and the lugs of the two front shoes coacting with the casing will be moved out of engagement with the outer end walls of the recesses 29 and the rear ends of the rear shoes will be moved out of engagement with the transverse wall 20 of the casing.

Upon reduction of the actuating force, the wedging pressure will be relieved and there will be an initial release of friction shoes and wedges due to the spacing of the lugs as hereinbefore described, permitting movement of the shoes and wedges independently of any relative movement of the plates and movement of the casing A. An easy and quick release and certain reduction of the lateral pressure on the groups of plates is thus assured. As the two pairs of shoes at the front and rear ends of the mechanism are longitudinally separated, due to the expansive action of the twin spring resistance elements E, the lugs on the shoes will come into engagement with the outer end walls of the openings 31 restoring the plates to normal position. The relative separating movement of the front and rear shoes will be limited by the outer ends of the rear shoes coming into engagement with the end wall 20 of the casing and the lugs on the two outermost shoes of the front pairs coming into engagement with the outer walls of the recesses 29, effecting restoration of the casing to normal position also.

I have herein shown and described what I now consider the preferred manner of carrying out the invention, but the same is merely illustrative and I contemplate all changes and modifications that come within the scope of the claims appended hereto.

I claim:

1. In a friction shock absorbing mechanism, the combination with a casing divided into a plurality of longitudinally disposed friction shells by longitudinally extending bracing column means, said shells each being open at one end and having a transverse wall at the opposite end; of relatively movable follower-acting means cooperating with said casing and having their relative movement limited by engagement with the opposite ends of the casing; a plurality of relatively movable friction plates, said plates being divided into a plurality of sets, two sets co-operating with each friction shell; spreading means interposed between the sets of each shell at the opposite ends of said plates, each spreading means including a pair of friction wedge shoes and a cooperating wedge, one of said pairs of wedge shoes coacting with the end wall of the corresponding shell to restore the same to normal position after each compression stroke; and a spring resistance interposed between the spreading means of each friction shell.

2. In a friction shock absorbing mechanism, the combination with front and rear follower members, relatively movable toward and away from each other; of a casing having side walls and a central partition wall forming a longitudinallly disposed column element, said column element having a pair of friction surfaces thereon and each of said side walls being provided with a friction surface, said casing being open at one end and having a transverse end wall at the opposite end, said end wall being normally spaced from the corresponding follower; a plurality of longitudinally disposed, relatively movable friction plates, divided into sets, one set of plates cooperating with each friction surface of said casing, certain of said plates bearing at one end on said transverse end wall, and the remaining plates having their corresponding ends normally spaced from said end wall; twin arranged spreading means, each of said twin means cooperating with two of said sets of plates; and a main spring resistance cooperating with each spreading means.

3. In a friction shock absorbing mechanism, the combination with front and rear, relatively movable followers; a casing interposed between said followers, said casing being divided into twin friction shells by a longitudinal column element, each of said shells being open at one end and having a transverse end wall at the opposite end, each of said shells also having a pair of opposed, longitudinally disposed friction surfaces; a friction system cooperating with each shell, each system including front and rear pairs of friction wedge shoes and front and rear wedges cooperating with said shoes, said wedges being adapted to be moved directly by said followers, the shoes at the rear end of the mechanism coacting with the end walls of the shells, and the shoes at the front end of the mechanism having the lugs thereof cooperating with abutment means on the shell for restoring the latter to normal position; and main spring resistance elements interposed between said front and rear pairs of shoes.

In witness that I claim the foregoing I have hereunto subscribed my name this 1st day of July 1924.

WILLIAM A. GEIGER.